(12) United States Patent
Taguchi et al.

(10) Patent No.: US 9,952,690 B2
(45) Date of Patent: Apr. 24, 2018

(54) TABLET DEVICE, AND OPERATION RECEIVING METHOD

(71) Applicant: FUJITSU LIMITED, Kawasaki-shi, Kanagawa (JP)

(72) Inventors: Akinori Taguchi, Kawasaki (JP); Satoshi Nakashima, Kawasaki (JP); Masayoshi Shimizu, Hadano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/925,000

(22) Filed: Jun. 24, 2013

(65) Prior Publication Data

US 2014/0015778 A1    Jan. 16, 2014

(30) Foreign Application Priority Data

Jul. 13, 2012 (JP) .................................. 2012-157568

(51) Int. Cl.
*G06F 3/01* (2006.01)
*G06F 3/041* (2006.01)
*G06F 3/0488* (2013.01)

(52) U.S. Cl.
CPC .............. *G06F 3/041* (2013.01); *G06F 3/013* (2013.01); *G06F 3/0488* (2013.01); *G06F 2203/04806* (2013.01)

(58) Field of Classification Search
CPC .................. G06F 3/041; G06F 3/0484–3/0486
See application file for complete search history.

(56) References Cited

U.S. PATENT DOCUMENTS

| | | | |
|---|---|---|---|
| 2004/0046796 A1* | 3/2004 | Fujita | G06F 3/0481 715/767 |
| 2004/0212617 A1 | 10/2004 | Fitzmaurice et al. | |
| 2005/0140660 A1* | 6/2005 | Valikangas | 345/173 |
| 2005/0140661 A1* | 6/2005 | Collins | G06F 3/04886 345/173 |
| 2008/0163053 A1* | 7/2008 | Hwang | G06F 3/04886 715/702 |

(Continued)

FOREIGN PATENT DOCUMENTS

| | | |
|---|---|---|
| EP | 2249241 A1 | 11/2010 |
| EP | 2664985 A2 | 11/2013 |

(Continued)

OTHER PUBLICATIONS

Takashi Nagamatsu et al., "MobiGaze: Development of a Gaze Interface for Handheld Mobile Devices," CHI 2010: Work-in-Progress (Spotlight on Poster Days 1& 2), pp. 3349-3354, (Apr. 12-13, 2010).

(Continued)

*Primary Examiner* — Seokyun Moon
(74) *Attorney, Agent, or Firm* — Staas & Halsey LLP

(57) ABSTRACT

A tablet device 100 according to an embodiment specifies a target area on a touch panel in which an operation is performed and determines the content of the touch operation performed in the target area. For example, the tablet device specifies the target area on the basis of the eye gaze position detected by a eye gaze detecting unit. Then, the tablet device creates a menu image that includes an option associated with the content of the touch operation, displays the created menu image in the default area, and receives the touch operation.

10 Claims, 17 Drawing Sheets

(56) References Cited

U.S. PATENT DOCUMENTS

| | | | |
|---|---|---|---|
| 2009/0128498 A1 | 5/2009 | Hollemans et al. | |
| 2010/0171709 A1* | 7/2010 | Toyokawa | |
| 2011/0175932 A1* | 7/2011 | Yu et al. | 345/661 |
| 2012/0127107 A1* | 5/2012 | Miyashita et al. | 345/173 |
| 2012/0256967 A1* | 10/2012 | Baldwin et al. | 345/684 |
| 2012/0272179 A1* | 10/2012 | Stafford | 715/781 |
| 2012/0288139 A1* | 11/2012 | Singhar | 382/103 |
| 2013/0219340 A1* | 8/2013 | Linge | 715/834 |

FOREIGN PATENT DOCUMENTS

| | | |
|---|---|---|
| JP | 2000-89905 | 3/2000 |
| JP | 2007-179502 | 7/2007 |
| JP | 2010-160564 | 7/2010 |
| JP | 2013-254406 | 12/2013 |
| KR | 10-2007-0036077 | 4/2007 |
| WO | 2009/090704 A1 | 7/2009 |
| WO | 2011/089199 A1 | 7/2011 |

OTHER PUBLICATIONS

Notice of Preliminary Rejection, dated May 27, 2014, in corresponding Korean Application No. 10-2013-81533 (8 pp.).
Korean Office Action dated Nov. 26, 2014 in corresponding Korean Patent Application No. 10-2013-0081533.
Japanese Office Action dated Mar. 29, 2016 in corresponding Japanese Patent Application No. 2012-157568.
Extended European Search Report dated Mar. 21, 2016 in corresponding European Patent Application No. 13173394.1.
Japanese Office Action dated Sep. 20, 2016 in corresponding Japanese Patent Application No. 2012-157568.

\* cited by examiner

| X COORDINATE | IMAGE ENLARGEMENT PERCENTAGE (%) |
|---|---|
| 0 | 10 |
| ... | ... |
| xd | 100 |
| ... | ... |
| xm | 200 |

| BUTTON IDENTIFICATION INFORMATION | OPERATION CONTENT | LINK COORDINATES |
|---|---|---|
| SELECTION BUTTON 31a | SELECT SELECTION ITEM | x1, y1 |
| SELECTION BUTTON 31b | SELECT SELECTION ITEM | x2, y2 |
| SELECTION BUTTON 31c | SELECT SELECTION ITEM | x3, y3 |
| ... | ... | ... |

FIG.10

| BUTTON IDENTIFICATION INFORMATION | OPERATION CONTENT | VIDEO IMAGE AREA OF LINK DESTINATION |
|---|---|---|
| REPLAY BUTTON 32a | REPLAY MOVING IMAGE | |
| STOP BUTTON 32b | STOP MOVING IMAGE | |
| SOUND BUTTON 32c | TURN OFF SOUND WHEN SOUND IS ON AND TURN ON SOUND WHEN SOUND IS OFF | (x4, y4)/(x5, y5) |
| ... | ... | |

152c

TABLET DEVICE, AND OPERATION RECEIVING METHOD

CROSS-REFERENCE TO RELATED APPLICATIONS

This application is based upon and claims the benefit of priority of the prior Japanese Patent Application No. 2012-157568, filed on Jul. 13, 2012, the entire contents of which are incorporated herein by reference.

FIELD

The embodiments discussed herein are related to a tablet device and the like.

BACKGROUND

Tablet devices, such as smart phones, mobile phones, the Personal Handy-phone System (PHS), and personal digital assistants (PDA), are becoming widely used. Because tablet devices are compact and lightweight, a user can use a tablet device anywhere.

When a user operates a tablet device, the user touches, with his/her finger, an item from among various items displayed on the tablet device's touch panel. For example, the user performs a touch operation to select a hypertext on a Web page displayed on the touch panel, to enlarge an image, to replay or stop a video image, and the like. These related-art examples are described, for example in Non-Patent Document 1: "MobiGaze, Development of a Gaze Interface for Handheld Mobile Devices", Apr. 12-13, 2010.

However, with the conventional technology, there is a problem in that, it is not convenient to operate the touch panel with one hand.

For example, when a user is holding a hand strap in a train or carrying a bag or an umbrella in one hand, the user needs to operate the touch panel of the tablet device with his/her other hand. When a user operates a touch panel with just one hand, the reach of the user's fingers is limited and thus the touch panel is inconvenient for the user to operate.

SUMMARY

According to an aspect of an embodiment, a tablet device includes a memory; and a processor coupled to the memory, wherein the processor executes a process comprising: specifying an area, on a touch panel, in which a touch operation is performed; first determining the content of the touch operation performed in the area specified by the specifying; and creating an option associated with the content of the touch operation determined by the determining displaying the created option in a predetermined area of the touch panel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a schematic diagram illustrating an example of association relationship information (No. 1);

FIG. 9 is a schematic diagram illustrating an example of association relationship information (No. 2);

FIG. 10 is a schematic diagram illustrating an example of association relationship information (No. 3);

DESCRIPTION OF EMBODIMENT(S)

Preferred embodiments of the present invention will be explained with reference to accompanying drawings. The present invention is not limited to these embodiments.

[a] First Embodiment

Figure 1:
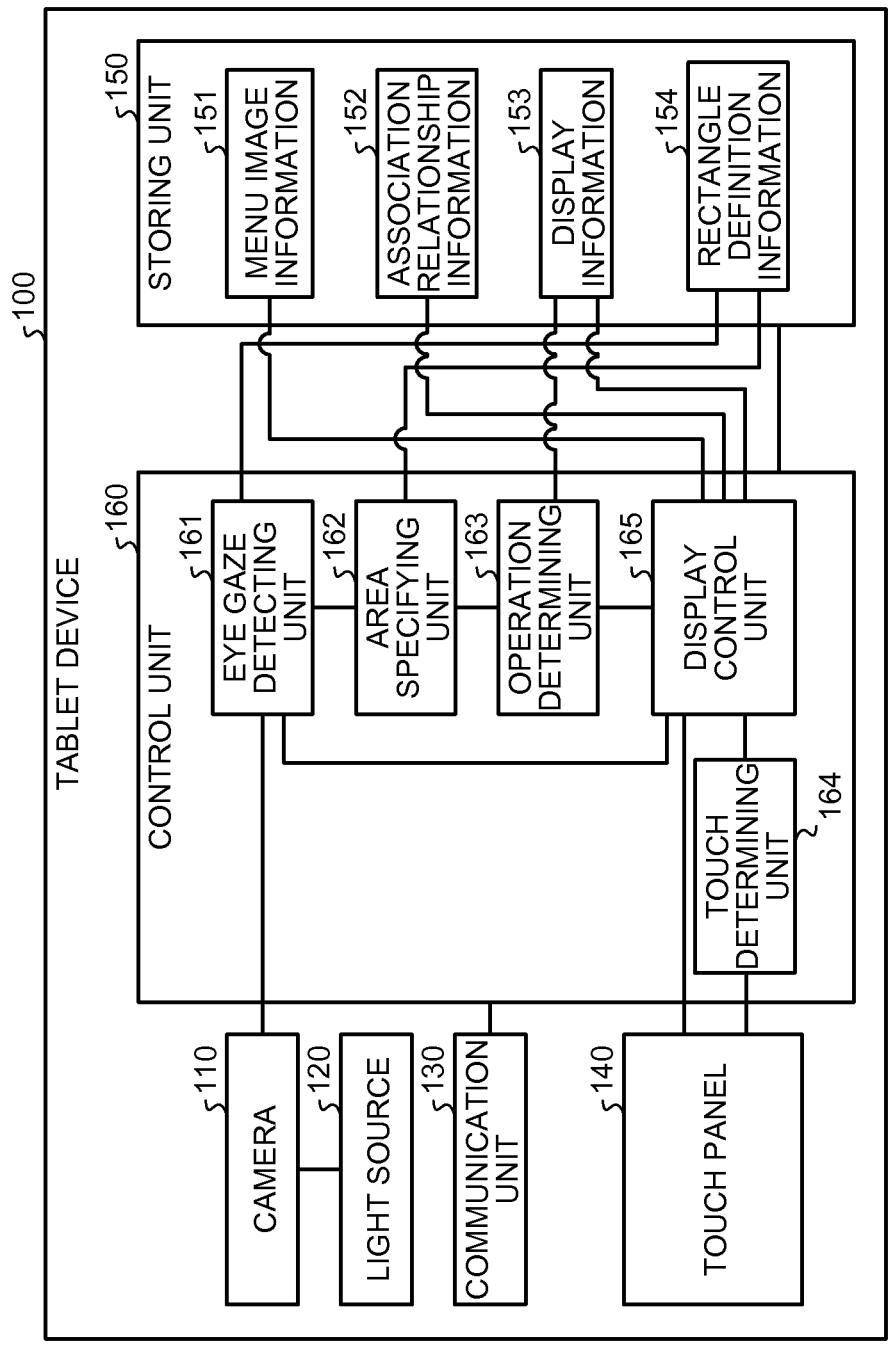
FIG. 1 is a schematic diagram illustrating the configuration of a tablet device according to a first embodiment.

In the following, the configuration of a tablet device according to a first embodiment will be described. FIG. 1 is a schematic diagram illustrating the configuration of a tablet device according to a first embodiment. As illustrated in FIG. 1, a tablet device 100 includes a camera 110, a light source 120, a communication unit 130, a touch panel 140, a storing unit 150, and a control unit 160. The configurations of the other components in the tablet device 100 are the same as those in a known tablet device.

The camera 110 is an imaging device that uses, for example, a charge coupled device (CCD) or a complementary metal oxide semiconductor (CMOS). The camera 110 captures an image of a subject that is in an image capturing area and outputs the captured image data on the subject to an eye gaze detecting unit 161.

The camera 110 controls the light source 120 such that the subject is irradiated with infrared light when an image is captured. If a user's eyes are included in the subject captured by the camera 110, light reflected from the retina is also captured by the camera 110 and thus it is possible to obtain an image in which the pupils of the eyes are brighter than other portions. Note that the camera 110 may also be a camera that is pre-mounted on the tablet device 100 before shipment or a digital camera connected as an external unit.

The light source 120 is a device that irradiates a subject with infrared light in response to a control instruction from the camera 110. The communication unit 130 is a processing unit that performs data communication with another device connected to a network. For example, the communication unit 130 corresponds to a wireless communication apparatus. The control unit 160, which will be described later, accesses a server or the like on the network via the communication unit 130.

The touch panel 140 is an interface that has two functions: a display function and an input function. The touch panel 140 displays information that is output from the control unit 160. Furthermore, if the touch panel 140 receives a touch operation, the touch panel 140 outputs, to the control unit 160, information on the position of the screen that was touched.

Figure 2:
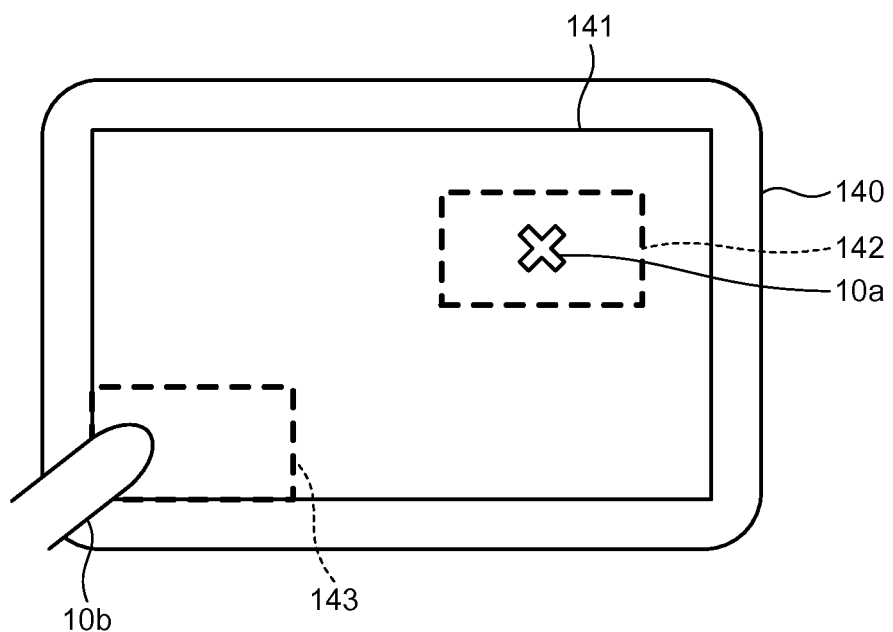
FIG. 2 is a schematic diagram illustrating each area of a screen of a touch panel.

In the first embodiment, for convenience of description, an eye gaze detecting area, a target area, and a default area are defined on the screen of the touch panel 140. FIG. 2 is a schematic diagram illustrating each area of the screen of the touch panel. As illustrated in FIG. 2, the touch panel 140 includes an eye gaze detecting area 141, a target area 142, and a default area 143.

For example, the eye gaze detecting area 141 is an area corresponding to the display screen on the touch panel 140. The target area 142 is an area on the screen that includes a position, detected by the eye gaze detecting unit 161 that will be described later, of a subject that is in a user's line of sight, i.e., an eye gaze position 10a. The default area 143 is an area that can be reached by a thumb 10b of a user being used to supporting the tablet device 100 when the user operates the tablet device 100 with one hand.

Figure 3:
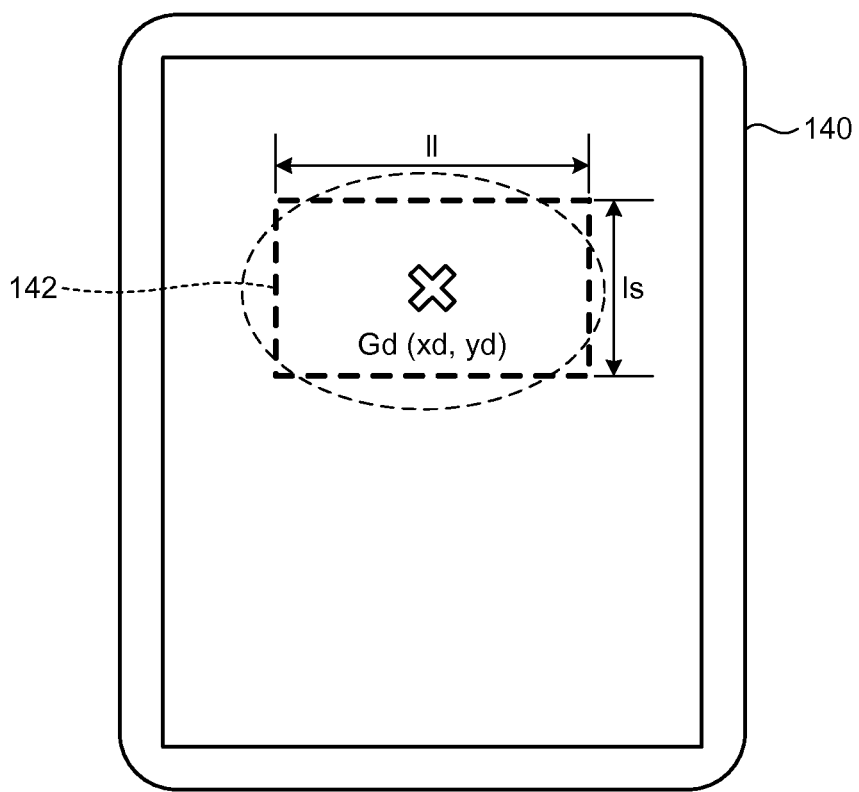
FIG. 3 is a schematic diagram illustrating a target area.

In the following, the target area 142 will be described. FIG. 3 is a schematic diagram illustrating a target area. As illustrated in FIG. 3, the target area 142 is defined by a width ll and a height ls. The center of gravity of the rectangle formed by the width ll and the height ls is defined as the center of gravity Gd (xd, yd). An area specifying unit 162, which will be described later, adjusts the center of gravity Gd of the target area 142 such that it overlaps with the eye gaze position 10a of the user and thereby the position of the target area 142 moves. It is assumed that the values of the width ll and the height ls are previously set.

Figure 4:
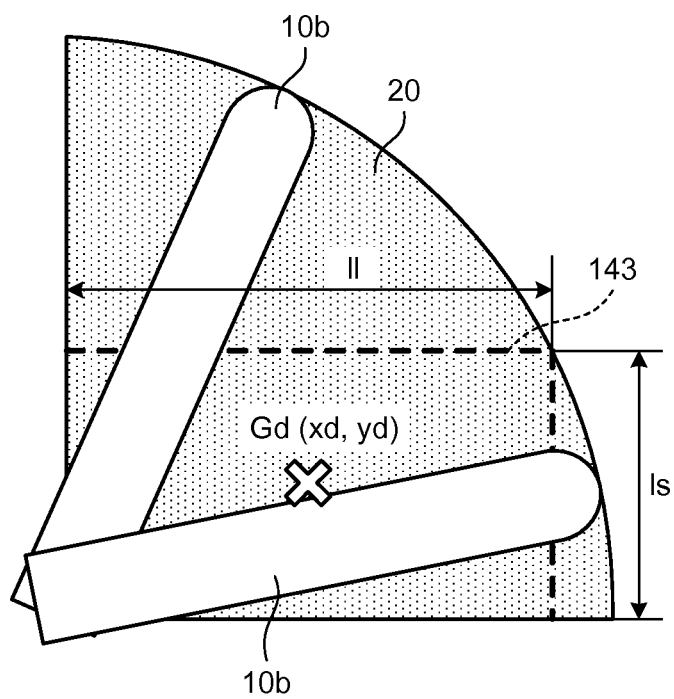
FIG. 4 is a schematic diagram illustrating a default area.

In the following, the default area 143 will be described. FIG. 4 is a schematic diagram illustrating a default area. As illustrated in FIG. 4, the default area 143 is defined by the center of gravity Gd (xd, yd), in which the center of gravity of the default area 143 is present and is defined by the width ll and by the height ls. The shape and the size defined in this default area 143 are the same range as a range 20 that can be reached by the thumb 10b, which is being used to support the tablet device 100 while the user is holding the tablet device 100, or is a range having a smaller shape and size than the range 20. If the vertical direction of an image displayed on the screen of the touch panel 140 has already been determined, it may also be possible to set the center of gravity Gd (xd, yd) such that the lower left corner in which the screen is displayed matches the lower left corner of the default area 143.

A description will be given here by referring back to FIG. 1. The storing unit 150 is a storage device that stores therein menu image information 151, association relationship information 152, display information 153, and rectangle definition information 154. For example, the storing unit 150 corresponds to a semiconductor memory device, such as a random access memory (RAM), a read only memory (ROM), or a flash memory, and a storage device, such as a hard disk or an optical disk.

Figure 5:
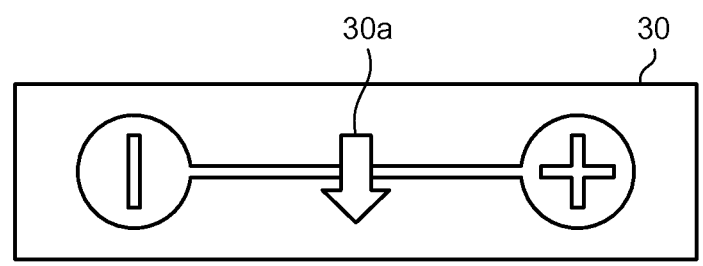
FIG. 5 is a schematic diagram illustrating an example of a menu image (No. 1)
Figure 6:
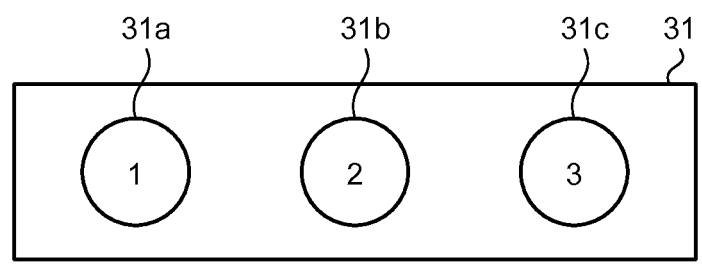
FIG. 6 is a schematic diagram illustrating an example of another menu image (No. 2)
Figure 7:
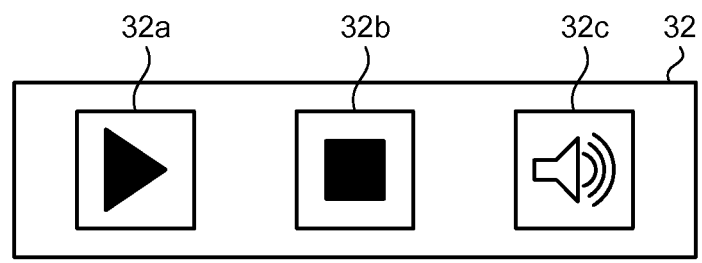
FIG. 7 is a schematic diagram illustrating an example of another menu image (No. 3)

The menu image information 151 includes information on various menu images used for performing various operations. A menu image is displayed in the default area 143 of the touch panel 140 and a user performs a touch operation on the menu image. In the following, an example of each menu image will be described. FIGS. 5 to 7 are schematic diagrams each illustrating an example of a menu image.

A menu image 30 illustrated in FIG. 5 is used for adjusting the size of an image. For example, a user slides an arrow 30a of the menu image 30 from the left side to the right side, thereby enlarging a target image or target text characters.

A menu image 31 illustrated in FIG. 6 includes multiple selection buttons 31a, 31b, and 31c. As will be described later, each of the selection buttons 31a to 31c is associated with each of the option items that are displayed on the screen of the touch panel 140. By performing a touch operation on one of the selection buttons 31a to 31c, a user selects a target option item. For example, an option item on a Web page corresponds to something in hypertext.

A menu image 32 illustrated in FIG. 7 is used for operating a video image. For example, the menu image 32 includes a replay button 32a, a stop button 32b, and a sound button 32c. For example, by performing a touch operation on the replay button 32a, a user replays a target video image. By performing a touch operation on the stop button 32b, the user stops the target video image. By performing a touch operation on the sound button 32c, the user switches the sound of the video image between sound on and sound off.

The menu images included in the menu image information 151 are not limited to the menu images illustrated in FIGS. 5 to 7. Furthermore, the content of the menu images illustrated in FIGS. 5 to 7 are only examples and may also be appropriately changed.

A description will be given here by referring back to FIG. 1. The association relationship information 152 is information used for associating the touch operations with respect to the menu images illustrated in FIGS. 5 to 7 with items on the touch panel 140. The association relationship information 152 includes multiple pieces of association relationship information associated with the menu images. For example, the association relationship information associated with the menu image 30 is represented by association relationship information 152a. The association relationship information associated with the menu image 31 is represented by association relationship information 152b. The association relationship information associated with the menu image 32 is represented by association relationship information 152c. FIGS. 8 to 10 are schematic diagrams each illustrating an example of association relationship information.

FIG. 8 illustrates an example of the association relationship information 152a associated with the menu image 30.

As illustrated in FIG. 8, the association relationship information 152a associates the x coordinate and an image enlargement percentage. The x coordinate corresponds to the x coordinate of the arrow 30a on the menu image 30. The image enlargement percentage corresponds to an enlargement percentage when a target image or target text character is enlarged. For example, if the x coordinate of the arrow 30a is "0", the image enlargement percentage is "10%". If the x coordinate of the arrow 30a is "xd", the image enlargement percentage is "100%". If the x coordinate of the arrow 30a is "xm", the image enlargement percentage is "200%".

FIG. 9 illustrates an example of the association relationship information 152b associated with the menu image 31. As illustrated in FIG. 9, the association relationship information 152b associates button identification information, operation content, and the link coordinates with each other. The button identification information is information for identifying each selection button included in the menu image 31. The operation content is information indicating the operation contents obtained when the touch operation is performed on a selection button. The link coordinates indicates the coordinates of the option item on the touch panel 140. For example, if the selection button 31a is subjected to the touch operation, an option item at the link coordinates "x1, y1" on the touch panel 140 is selected.

FIG. 10 illustrates an example of the association relationship information 152c associated with the menu image 32. As illustrated in FIG. 10, the association relationship information 152c associates button identification information, the operation content, and the video image area of the link destination with each other. The button identification information is information for identifying each button included in the menu image 32. The operation content is information indicating the operation content obtained when the touch operation is performed on a selection button. The video image area of the link destination indicates an area, on the touch panel 140, of the video image that is operated by the menu image 32. The video image area of the link destination includes, for example, the upper left coordinates and the lower right coordinates of the video image. If the replay button 32a is subjected to a touch operation, the video image in the video image area "(x4, y4) and (x5, y5)" on the touch panel 140 is replayed.

A description will be given here by referring back to FIG. 1. The display information 13 is information on the screen displayed on the touch panel 140. For example, if information on a Web page is displayed on the touch panel 140, the source code of the Web page is included in the display information 153.

The rectangle definition information 154 includes information on the range of the eye gaze detecting area 141, the length of each side of the target area 142, and the default area 143, which are illustrated in FIG. 2.

The control unit 160 includes the eye gaze detecting unit 161, the area specifying unit 162, an operation determining unit 163, a touch determining unit 164, and a display control unit 165. For example, the control unit 160 corresponds to an integrated circuit, such as an application specific integrated circuit (ASIC) or a field programmable gate array (FPGA). Furthermore, the control unit 160 corresponds to an electronic circuit, such as a CPU or a micro processing unit (MPU).

The eye gaze detecting unit 161 is a processing unit that detects the eye gaze position on the touch panel 140. The eye gaze detecting unit 161 outputs information on the eye gaze position to the area specifying unit 162. For example, the eye gaze detecting unit 161 uses an algorithm, such as corneal reflex, on an image of the subject output by the camera 110 and detects, from the center position of the pupils of the eyes, the position of the point at which the eyes are looking indicated by the direction of the eye gaze. In the embodiment, the position of such a point is referred to as an eye gaze position.

In this example, a description has been given of a case in which the eye gaze position is detected by using the corneal reflex; however, the eye gaze position may also be detected by using another method. For example, the eye gaze position may also be detected such that the tablet device 100 divides the screen of the touch panel 140, learns the shape of an eye looking at the divided area, and matches a template and the shape of an eye that is extracted from an image received from the camera 110. Furthermore, if a user wears a headset that detects the eye gaze position, the tablet device 100 may also acquire the eye gaze position detected by the headset.

The eye gaze detecting unit 161 detects the eye gaze position and determines, on the basis of the rectangle definition information 154, whether the detected sightline position is included in the eye gaze detecting area 141. If the eye gaze position is included in the eye gaze detecting area 141, the eye gaze detecting unit 161 outputs information on the eye gaze position to the area specifying unit 162.

The area specifying unit 162 is a processing unit that specifies an area in which the touch operation is performed. In the following, an example of a process performed by the area specifying unit 162 will be described. The area specifying unit 162 acquires the information on the eye gaze positions from the eye gaze detecting unit 161 and calculates the average of the eye gaze positions at predetermined time intervals. By using the average of the eye gaze positions as the coordinates of the center of gravity of the target area, the area specifying unit 162 specifies the range of the target area 142 illustrated in FIG. 2. The area specifying unit 162 outputs the information on the specified range of the target area 142 to the operation determining unit 163. The information on the range of the target area 142 contains, for example, the coordinates of the target area 142 on the touch panel 140.

The operation determining unit 163 is a processing unit that determines the content of the touch operation in the area of the target area 142. The operation determining unit 163 outputs the determined contents of the touch operation to the display control unit 165.

In the following, an example of a process performed by the operation determining unit 163 will be described. The operation determining unit 163 queries an element included in the target area 142 by using the Document Object Model (DOM). The DOM is an interface for accessing elements in, for example, xml or html documents. For example, the operation determining unit 163 uses elementFromPoint (x,y) of JavaScript (registered trademark). In the first embodiment, by using the DOM, the operation determining unit 163 acquires the source code associated with the target area 142 from the display information 153.

If a tag that is used to identify an image or a character is included in an element that is included in the target area 142, the operation determining unit 163 determines that an operation to adjust the size is to be performed. For example, the tag for identifying an image will be <img> and the tag for identifying a character will be <p>. Tags for identifying another image or character are defined in, for example, an HTML reference; therefore, a description thereof will be omitted.

If the operation determining unit 163 determines that an operation to adjust the size is to be performed, the operation determining unit 163 outputs, to the display control unit 165, information indicating that the operation to adjust the size will be performed and information on the range of the target area 142.

If the tag used to identify the link destination is included in the element that is included in the target area 142, the operation determining unit 163 determines that the operation to select the link destination is to be performed. Furthermore, the operation determining unit 163 adds up the number of links. For example, the tag used to identify the link destination will be <a href>. Tags used to identify the other link destinations are defined in an HTML reference or the like; therefore, a description thereof will be omitted.

If the operation determining unit 163 determines that the operation to select a link destination is to be performed, the operation determining unit 163 outputs, to the display control unit 165, information indicating that the operation to select the link destination is to be performed, the number of links, and the coordinates, on the screen, of the item to be selected.

If a tag for identifying a video image is included in an element that is included in the target area 142, the operation determining unit 163 determines that the operation on the video image is to be performed. For example, the tag for identifying the video image will be <video>. Tags used to identify the other video images are defined in a HTML reference or the like; therefore, a description thereof will be omitted.

If the operation determining unit 163 determines that the operation on the video image is to be performed, the operation determining unit 163 outputs, to the display control unit 165, information indicating that the operation is to be performed on the video image and information on the range of the target area 142.

The touch determining unit 164 is a processing unit that determines whether the touch operation has been performed on the touch panel 140. The touch determining unit 164 outputs, to the display control unit 165, the determination result indicating whether the touch operation has been performed.

The display control unit 165 is a processing unit that creates options associated with the determination result obtained by the operation determining unit 163 and that displays the options in the default area 143 of the touch panel 140. In the following, an example of a process performed by the display control unit 165 will be described. The display control unit 165 performs the process described below triggered when the display control unit 165 receives information from the touch determining unit 164 indicating that the touch operation has been performed.

In the following, a description will be given of a process performed when the display control unit 165 receives, from the operation determining unit 163, information indicating that an operation to adjust the size is performed and information on the range of the target area 142. The display control unit 165 acquires, from the menu image information 151, the menu image 30 that is used for performing the enlargement operation illustrated in FIG. 5. The display control unit 165 acquires, from the association relationship information 152, the association relationship information 152a associated with the menu image 30 and then associates the operation of the arrow 30a on the menu image 30 with the content of the operation.

After the display control unit 165 associates the content of the operation on the basis of the menu image 30 and the association relationship information 152a, the display control unit 165 displays the menu image 30 in the default area 143. If the display control unit 165 receives the touch operation with respect to the arrow 30a on the menu image 30, the display control unit 165 specifies the image enlargement percentage on the basis of the coordinates of the arrow 30a and the association relationship information 152a. The display control unit 165 enlarges, in accordance with the image enlargement percentage, the image or the character included in the target area 142.

In the following, a description will be given of a process performed when the display control unit 165 receives, from the operation determining unit 163, information indicating that the selection operation of the link destination is performed, the number of links, and the screen coordinates of the item to be selected. The display control unit 165 acquires, from the menu image information 151, the menu image 31 including the selection buttons illustrated in FIG. 6. Furthermore, by associating each selection button in the menu image 31 with the coordinates, on the screen, of the option item to be selected, the display control unit 165 creates the association relationship information 152 illustrated in FIG. 9. Furthermore, the display control unit 165 sets the content of each operation as an option item for selection. The display control unit 165 increases the number of selection buttons on the menu image 31 illustrated in FIG. 6 in accordance with the link counts.

After the display control unit 165 creates the association relationship information 152, the display control unit 165 displays the menu image 31 in the default area 143. If the display control unit 165 receives the touch operation with respect to the selection button on the menu image 31, the display control unit 165 compares the association relationship information 152b with the button identification information on the selection button that has received the touch operation and determines the link coordinates. The display control unit 165 selects an item of the link destination that is associated with the determined link destination coordinates and allows the touch panel 140 to display the information on the link destination. For example, if an item of the link destination is in hypertext, the display control unit 165 acquires the information on the link destination represented by the hypertext via a network and allows the touch panel 140 to display the acquired information.

In the following, a description will be given of a process performed when the display control unit 165 receives, from the operation determining unit 163, information indicating that the operation on the video image is performed and information on the range of the target area 142. The display control unit 165 acquires, from the menu image information 151, the menu image 32 used for performing the operation on the video image illustrated in FIG. 7. Furthermore, the display control unit 165 acquires, from the association relationship information 152, the association relationship information 152c associated with the menu image 32 and sets, in the coordinates of the range of the target area 142, a video image area of the link destination that is associated with the replay button 32a, the stop button 32b, and the sound button 32c, which are all on the menu image 32.

After associating the menu image 32 with the association relationship information 152c, the display control unit 165 displays the menu image 32 in the default area 143. If the display control unit 165 receives the touch operation with respect to the button on the menu image 32, the display control unit 165 specifies the operation content on the basis of the button identification information and the association relationship information 152c and then performs a process in accordance with the operation content. The display control unit 165 specifies the coordinates of the video image to be processed on the basis of the video image area of the link destination.

For example, if the touch operation is performed on the replay button 32a, the display control unit 165 replays the video image in the target area. If the touch operation is performed on the stop button 32b, the display control unit 165 stops the video image in the target area. If the touch operation is performed on the sound button 32c, the display control unit 165 switches the sound of the target video image, i.e., between sound on and sound off.

If the display control unit 165 does not receive the touch operation with respect to the target menu image within a predetermined time period after the display control unit 165 displays the menu image 30, 31, or 32 on the default area 143, the display control unit 165 deletes the menu image.

Figure 11:
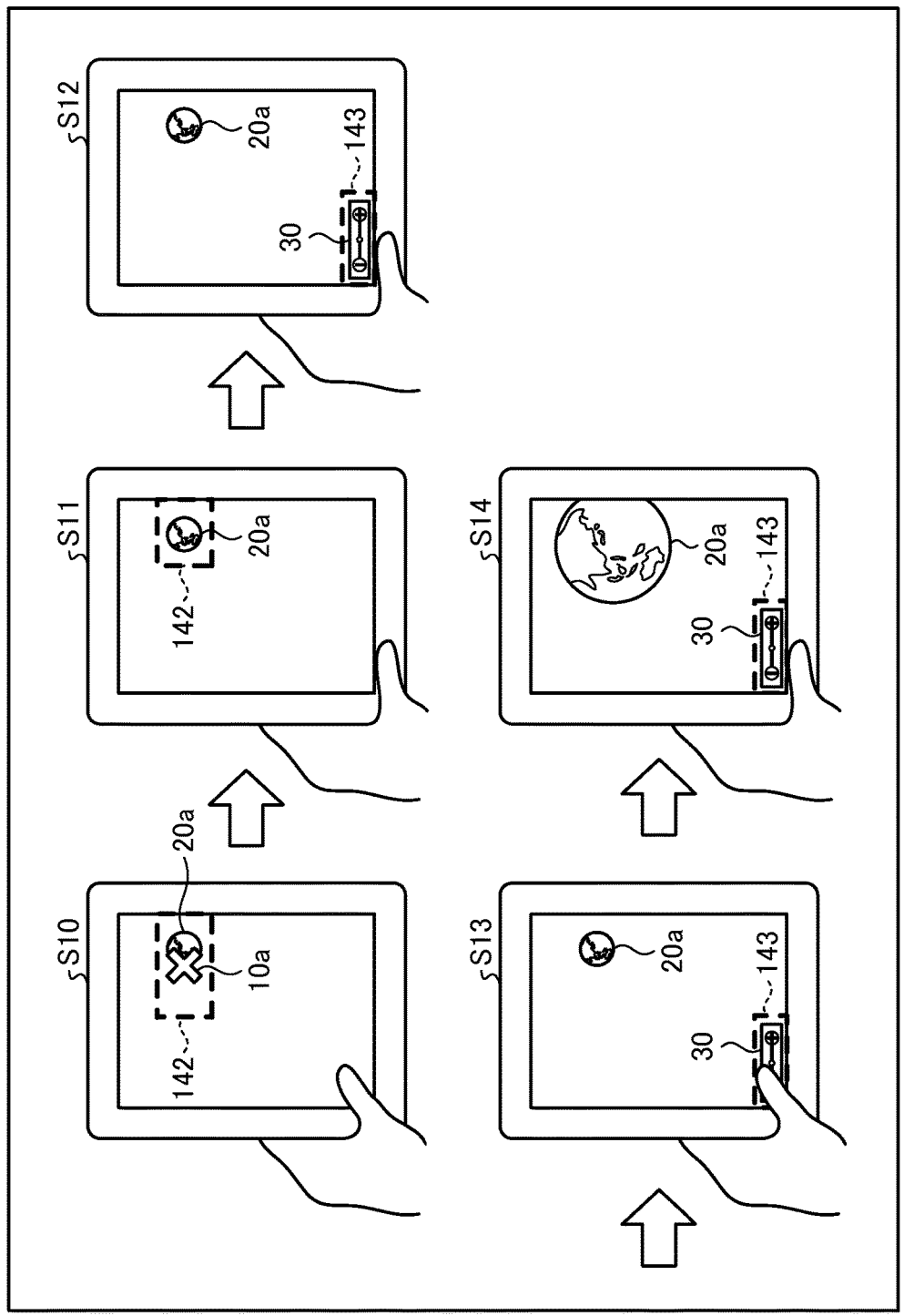
FIG. 11 is a schematic diagram illustrating screen images of the tablet device according to the first embodiment (No. 1)
Figure 12:
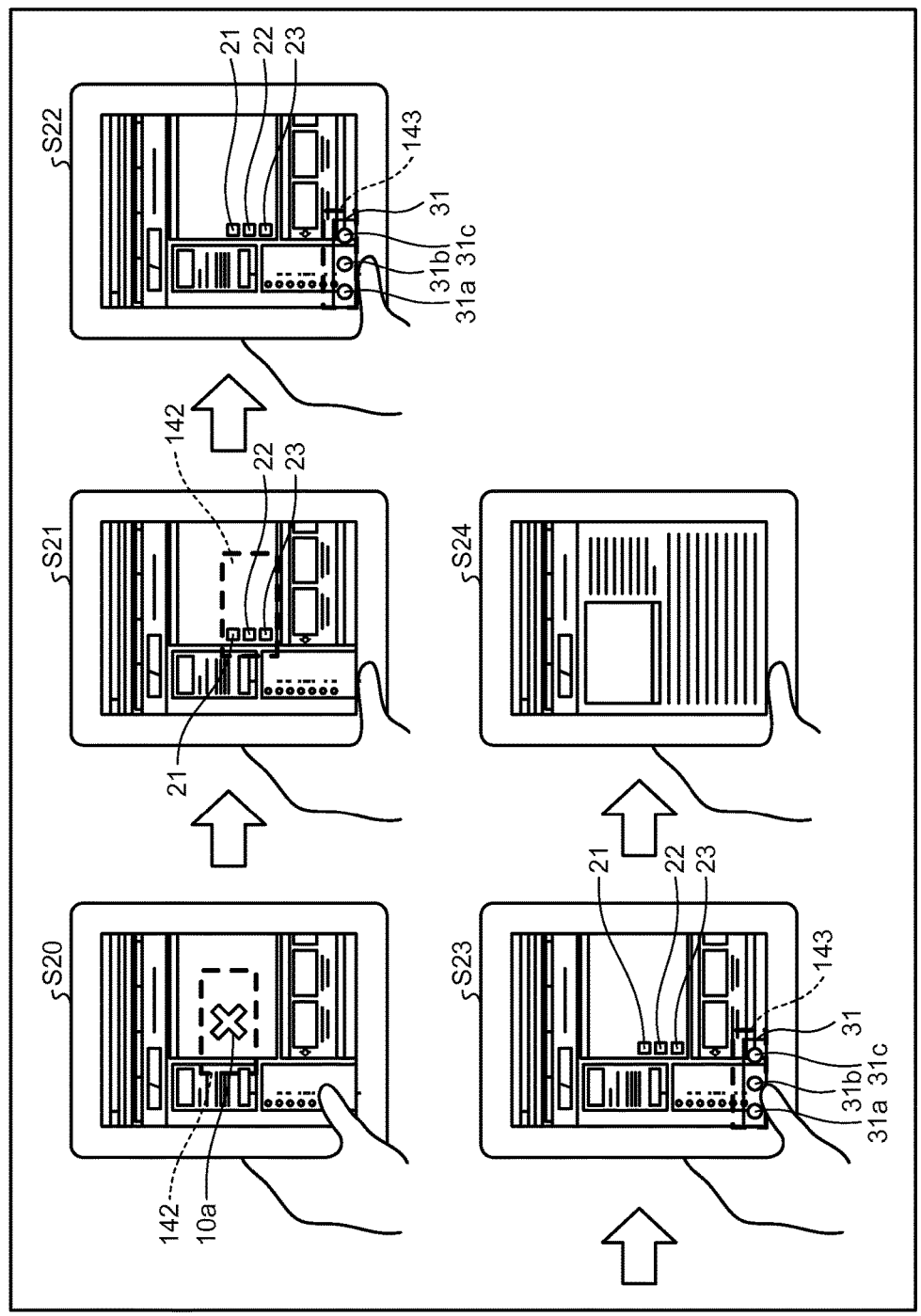
FIG. 12 is a schematic diagram illustrating screen images of the tablet device according to the first embodiment (No. 2)
Figure 13:
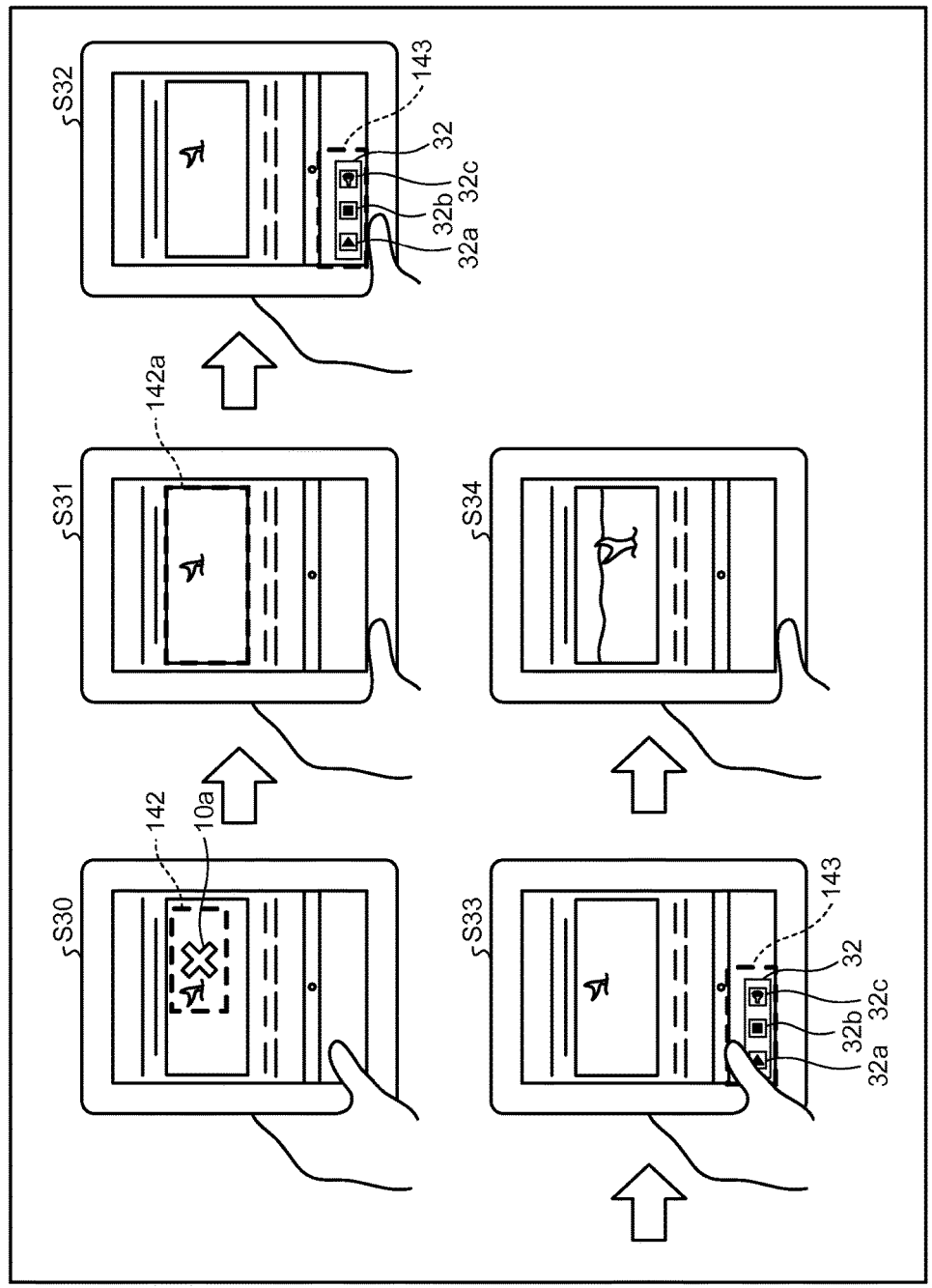
FIG. 13 is a schematic diagram illustrating screen images of the tablet device according to the first embodiment (No. 3)

In the following, a screen image on the tablet device 100 according to the first embodiment will be described. FIGS. 11 to 13 are schematic diagrams each illustrating screen images of the tablet device according to the first embodiment.

FIG. 11 illustrates screen images used when the operation to adjust the size is performed. As illustrated in FIG. 11, the tablet device 100 detects the eye gaze position 10a and sets the target area 142 (Step S10). The tablet device 100 determines, by using the DOM, that an image 20a is inside the target area 142 (Step S11).

The tablet device 100 displays the menu image 30 that is used to perform the enlargement operation in the default area 143 (Step S12). A user slides the arrow on the menu image 30 (Step S13). The tablet device 100 compares the coordinates of the arrow with the association relationship information 152a to determine the image enlargement percentage and enlarges the image 20a in accordance with the image enlargement percentage (Step S14).

FIG. 12 illustrates screen images used when the link destination is selected. As illustrated in FIG. 12, the tablet device 100 detects the eye gaze position 10a and sets the target area 142 (Step S20). By using the DOM, the tablet device 100 specifies, for example, a link destination 21, 22, or 23 from the target area 142 (Step S21).

The tablet device 100 displays, in the default area 143, the menu image 31 used for selecting the link destination. For example, if the link destination is three, the tablet device 100 displays, in the default area 143, the menu image 31 that includes three selection buttons 31a, 31b, and 31c (Step S22). For example, the selection buttons 31a, 31b, and 31c correspond to the link destinations 21, 22, and 23, respectively.

For example, a user performs a touch operation on the selection button 31a on the menu image 31 (Step S23). Then, the tablet device 100 determines that the link destination 21 with respect to the selection button 31a has been selected and then displays information that is linked to the link destination 21 (Step S24).

FIG. 13 illustrates screen images used when a moving image is operated. As illustrated in FIG. 13, the tablet device 100 detects the eye gaze position 10a and sets the target area 142 (Step S30). By using the DOM, the tablet device 100 determines that a video image is present in the target area 142. Furthermore, the tablet device 100 may also further specify a video image area 142a (Step S31).

The tablet device 100 displays, in the default area 143, the menu image 32 that is used to operate the video image (Step S32). For example, the replay button 32a, the stop button 32b, and the sound button 32c is included in the menu image 32.

For example, a user performs a touch operation on the replay button 32a (Step S33). If the replay button 32a is subjected to the touch operation, the tablet device 100 replays the video image (Step S34). Furthermore, if the stop button 32b is subjected to the touch operation, the tablet device 100 stops the video image. If the sound button 32c is subjected to the touch operation, the tablet device 100 switches the sound of the video image between sound on and sound off.

Figure 14:
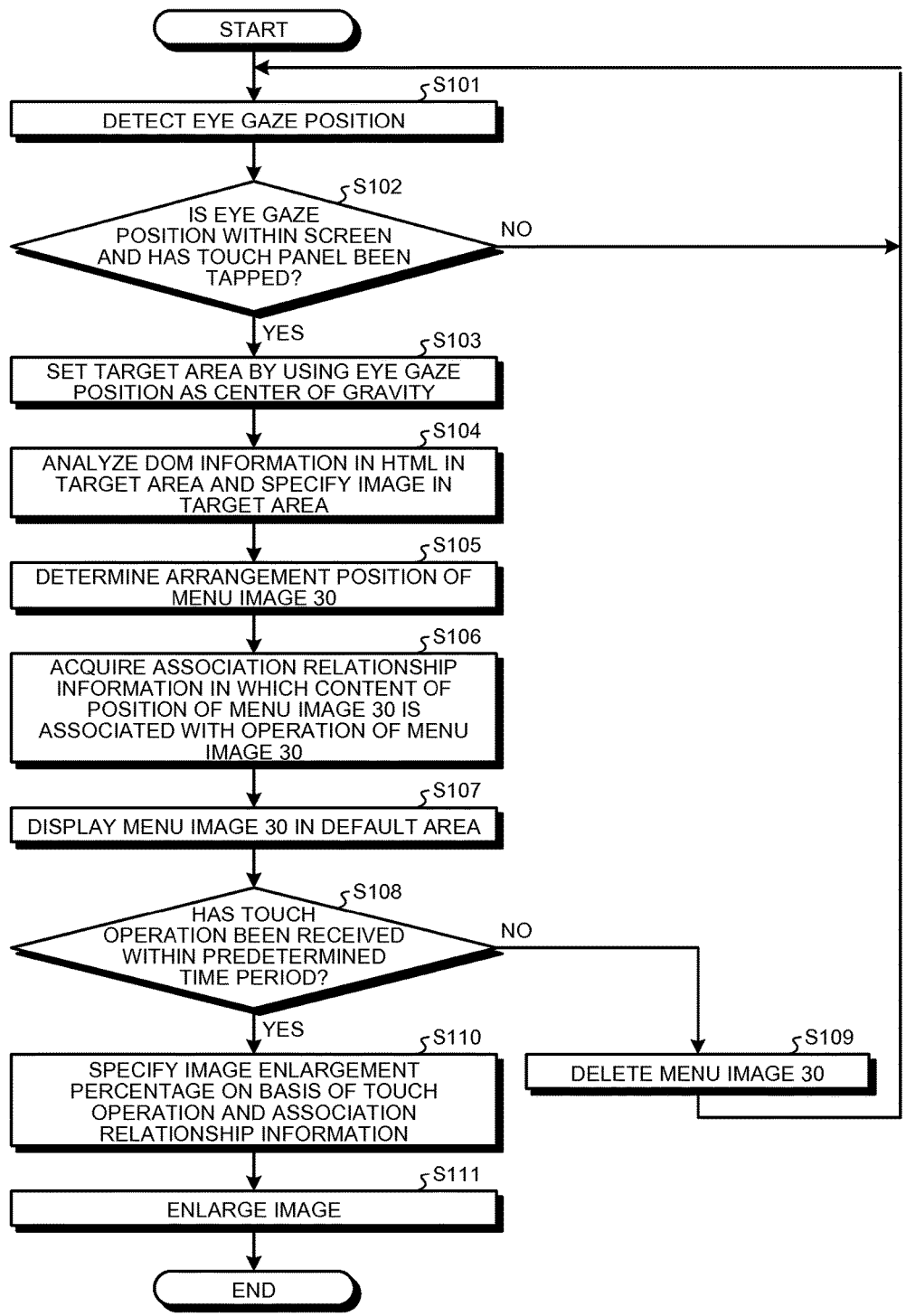
FIG. 14 is a flowchart illustrating the flow of a process performed by the tablet device according to the first embodiment (No. 1)
Figure 15:
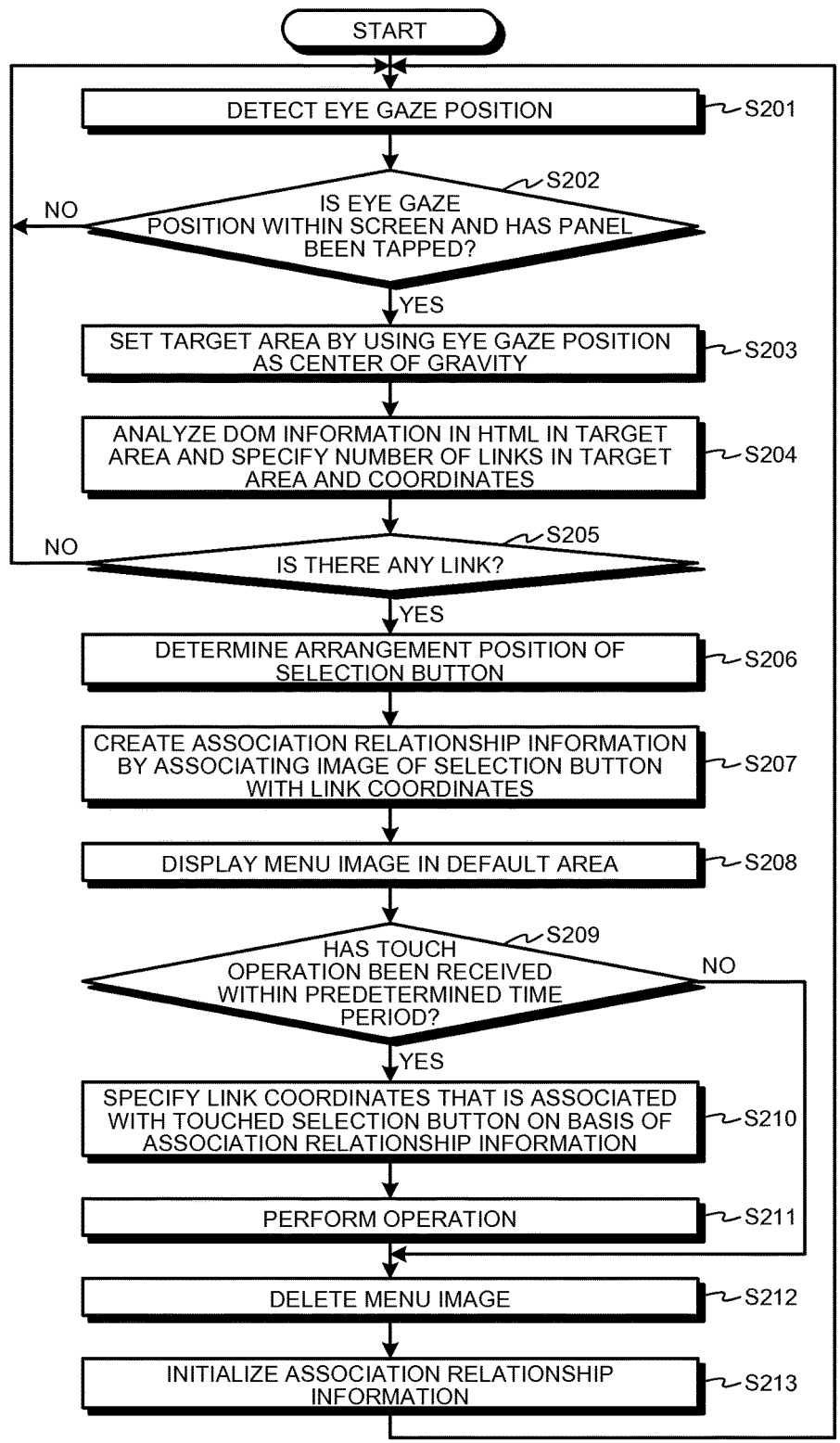
FIG. 15 is a flowchart illustrating the flow of a process performed by the tablet device according to the first embodiment (No. 2)
Figure 16:
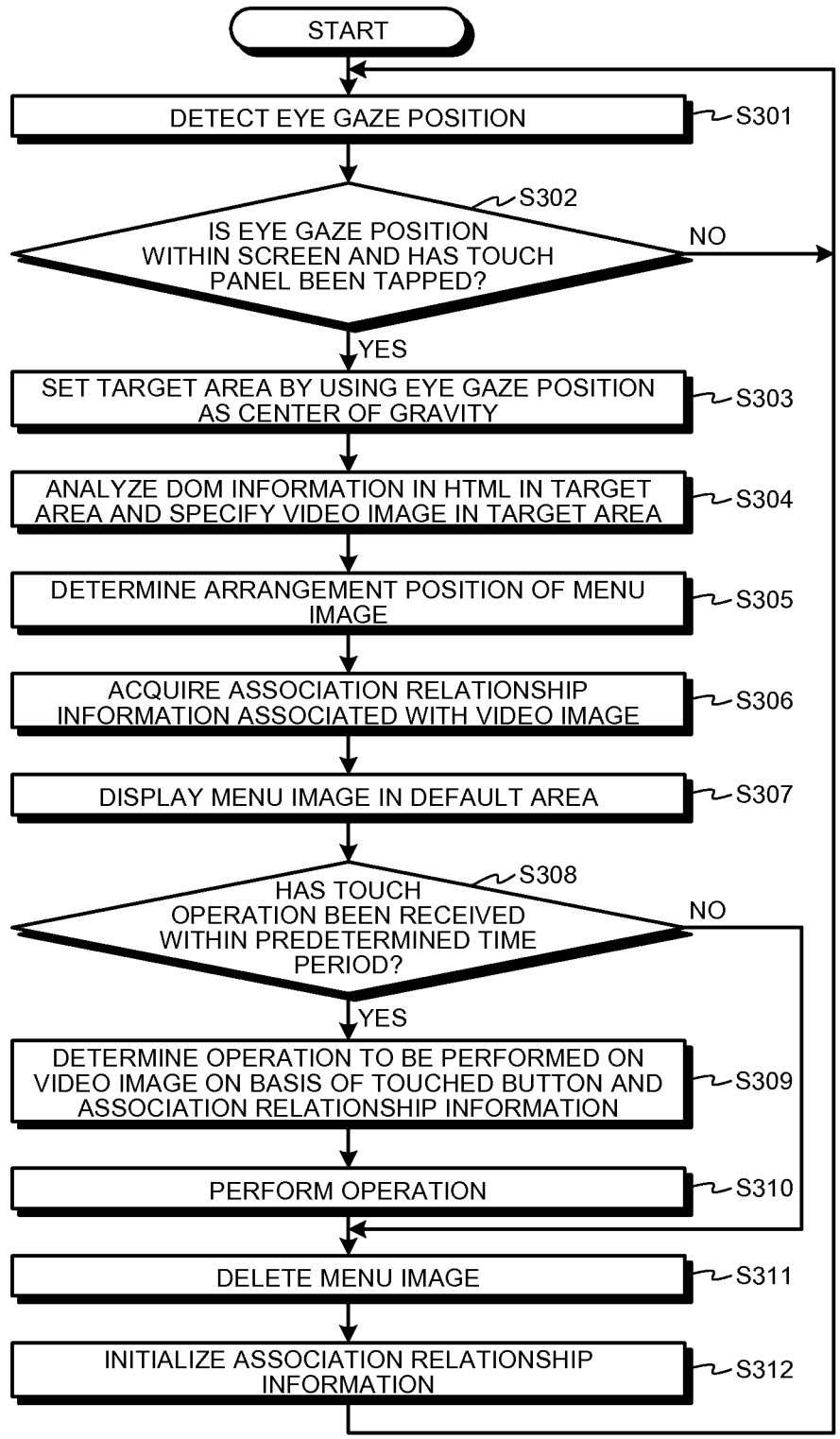
FIG. 16 is a flowchart illustrating the flow of a process performed by the tablet device according to the first embodiment (No. 3)

In the following, the flow of the process performed by the tablet device 100 according to the first embodiment will be described. FIGS. 14 to 16 are flowcharts each illustrating the flow of a process performed by the tablet device according to the first embodiment. Here, for convenience of description, descriptions are given of three separate cases: a case in which an operation to adjust the size is performed, a case in which an operation to select the link destination is performed, and a case in which an operation on a video image is performed.

FIG. 14 is a flowchart illustrating the flow of a process when the operation to adjust the size is performed. The process illustrated in FIG. 14 is performed when image data is acquired, for example, from the camera 110. As illustrated in FIG. 14, the tablet device 100 detects the eye gaze position (Step S101) and determines whether the eye gaze position is within the screen and whether the touch panel 140 has been tapped (Step S102). If the eye gaze position is not within the screen or if the touch panel 140 has not been tapped (No at Step S102), the tablet device 100 proceeds to Step S101.

In contrast, if the eye gaze position is within the screen and if the touch panel 140 has been tapped (Yes at Step S102), the tablet device 100 sets the target area 142 by using the eye gaze position as the center of gravity (Step S103). The tablet device 100 analyzes DOM information in the HTML in the target area 142 and specifies the image in the target area 142 (Step S104).

The tablet device 100 determines the arrangement position of the menu image 30 (Step S105) and acquires the association relationship information 152a in which the content of the position is associated with the operation of the menu image 30 (Step S106). The tablet device 100 displays the menu image 30 in the default area 143 (Step S107).

The tablet device 100 determines whether the touch operation has been received within a predetermined time period (Step S108). If the tablet device 100 does not receive the touch operation within the predetermined time period (No at Step S108), the tablet device 100 deletes the menu image 30 (Step S109) and proceeds to Step S101.

In contrast, if the tablet device 100 does receive the touch operation within the predetermined time period (Yes at Step S108), the tablet device 100 specifies an image enlargement percentage on the basis of both the touch operation and the association relationship information 152a (Step S110). Then, the tablet device 100 enlarges the image (Step S111).

FIG. 15 is a flowchart illustrating the flow of a process when the operation to select the link destination is performed. The process illustrated in FIG. 15 is performed when image data is acquired, for example, from the camera 110. As illustrated in FIG. 15, the tablet device 100 detects the eye gaze position (Step S201) and determines whether the eye gaze position is within the screen and whether the touch panel 140 has been tapped (Step S202). If the eye gaze position is not within the screen or if the touch panel 140 has not been tapped (No at Step S202), the tablet device 100 proceeds to Step S201.

In contrast, if the eye gaze position is within the screen and if the touch panel 140 has been tapped (Yes at Step S202), the tablet device 100 sets the target area 142 by using the eye gaze position as the center of gravity (Step S203). The tablet device 100 analyzes DOM information in the HTML in the target area 142 and specifies the number of links in the target area 142 and the coordinates (Step S204).

If no link is present (No at Step S205), the tablet device 100 proceeds to Step S201. If a link is present (Yes at Step S205), the tablet device 100 determines the arrangement position of the selection button (Step S206).

By associating an image of a selection button with the link coordinates, the tablet device 100 creates the association relationship information 152b (Step S207). The tablet device 100 then displays the menu image 31 in the default area 143 (Step S208).

The tablet device 100 determines whether a touch operation has been received within a predetermined time period (Step S209). If the tablet device 100 has not been received a touch operation within a predetermined time period (No at Step S209), the tablet device 100 proceeds to Step S212.

If the tablet device 100 does receive the touch operation within a predetermined time period (Yes at Step S209), the tablet device 100 specifies the link coordinates that is associated with the touched selection button on the basis of the association relationship information 152b (Step S210).

Then, the tablet device 100 performs a process related to an operation (Step S211). At Step S211, for example, the tablet device 100 displays the link destination of the link coordinates in the touch panel 140.

The tablet device 100 deletes the menu image (Step S212), initializes the association relationship information 152b (Step S213), and proceeds to Step S201.

FIG. 16 is a flowchart illustrating the flow of a process when the operation on a video image is performed. The process illustrated in FIG. 16 is performed when image data is acquired from, for example, the camera 110. As illustrated in FIG. 16, the tablet device 100 detects the eye gaze position (Step S301) and determines whether the eye gaze position is within the screen and the touch panel 140 has been tapped (Step S302). If the eye gaze position is not within the screen or if the touch panel 140 has not been tapped (No at Step S302), the tablet device 100 proceeds to Step S301.

In contrast, if the eye gaze position is within the screen and if the touch panel 140 has been tapped (Yes at Step S302), the tablet device 100 sets the target area 142 by using the eye gaze position as the center of gravity (Step S303). The tablet device 100 analyzes DOM information in the HTML in the target area 142 and specifies the video image in the target area 142 (Step S304).

The tablet device 100 determines the arrangement position of the menu image 32 (Step S305) and acquires the association relationship information 152c associated with the video image (Step S306). The tablet device 100 then displays the menu image 32 in the default area 143 (Step S307).

The tablet device 100 determines whether the touch operation has been received within the predetermined time period (Step S308). If the tablet device 100 has not received the touch operation within the predetermined time period (No at Step S308), the tablet device 100 proceeds to Step S311.

If the tablet device 100 does receive the touch operation within the predetermined time period (Yes at Step S308), the tablet device 100 determines the operation to be performed on the video image on the basis of the touched button and the association relationship information 152c (Step S309).

The tablet device 100 then performs the process related to the operation (Step S310). At Step S310, for example, if the replay button 32a is subjected to a touch operation, the tablet device 100 replays the video image in the target area 142. If the stop button 32b is subjected to a touch operation, the tablet device 100 stops the video image in the target area 142. If the sound button 32c is subjected to a touch operation, the tablet device 100 switches the sound of the video image of the target area 142 between sound on and sound off.

The tablet device 100 then deletes the menu image 32 (Step S311), initializes the association relationship information 152c (Step S312), and proceeds to Step S301.

In the following, the advantage of the tablet device 100 according to the first embodiment will be described. The tablet device 100 specifies the target area 142 in which the operation is performed on the touch panel 140 and then determines the content of the touch operation in the target area 142. Then, the tablet device 100 creates a menu image including the options with respect to the content of the touch operation, displays the default area 143, and receives the touch operation. Because the default area 143 is the reach of the user's thumb of the hand with which he or she is holding the tablet device 100, the user can conveniently operate the touch panel 140 even if the user is operating the tablet device with one hand.

Furthermore, it may also be possible for a user to perform the touch operation by displaying an image of the target area 142 in the default area 143 without processing anything; however, in such a case, the user sometimes doesn't conveniently perform the touch operation. For example, if an image or a hypertext targeted for operation is small, it is difficult for a user to perform the touch operation. Furthermore, if an image is too large with respect to the target area 142 and thus runs off the screen, it is also difficult for a user to perform the touch operation. However, because the tablet device 100 according to the first embodiment determines the content of the touch operation in the target area 142 and then displays the menu image in the default area 143, the tablet device 100 can implement a convenient operability that is less susceptible to the effects of the size of an image or a character.

Furthermore, the tablet device 100 detects the eye gaze position on the touch panel 140, specifies the target area 142 including the eye gaze position, and determines the content of the touch operation in the target area 142. Consequently, the user can conveniently perform operations in the target area even with one hand.

[b] Second Embodiment

In the following, a tablet device according to a second embodiment will be described. Unlike the tablet device 100 according to the first embodiment, a tablet device 200 according to the second embodiment is a specialized tablet device for enlarging an image or a character in a target area.

Figure 17:
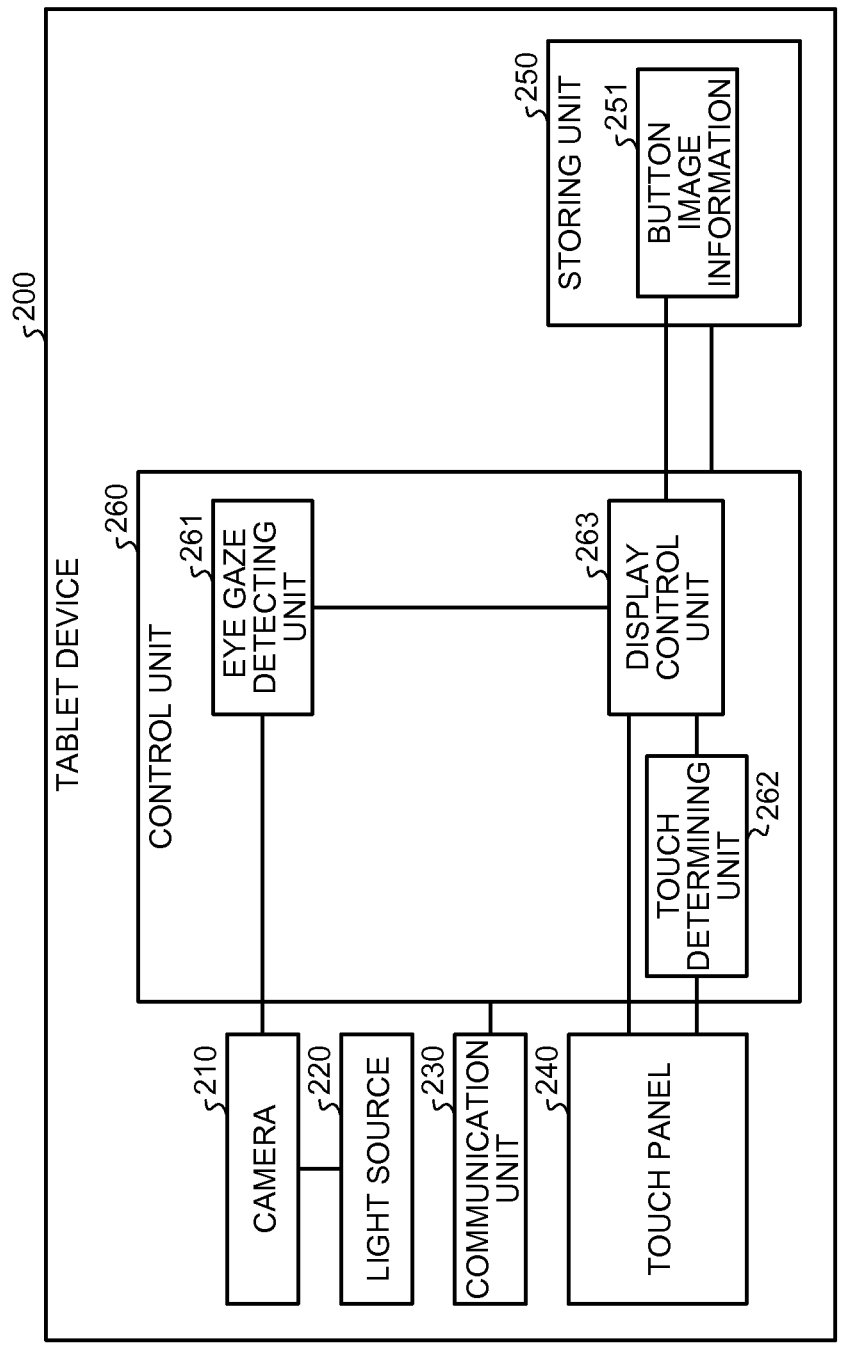
FIG. 17 is a schematic diagram illustrating the configuration of a tablet device according to a second embodiment.

FIG. 17 is a schematic diagram illustrating the configuration of a tablet device according to a second embodiment. As illustrated in FIG. 17, the tablet device 200 includes a camera 210, a light source 220, a communication unit 230, a touch panel 240, a storing unit 250, and a control unit 260.

The configurations of the camera 210, the light source 220, the communication unit 230, and the touch panel 240 are the same as those of the camera 110, the light source 120, the communication unit 130, and the touch panel 140 described in the first embodiment; therefore, the descriptions thereof will be omitted.

The storing unit 250 is a storage device that stores therein button image information 251. For example, the storing unit 250 corresponds to a semiconductor memory device, such as a RAM, a ROM, and a flash memory, or a storage device, such as a hard disk and an optical disk.

The button image information 251 includes image information on an enlargement button that is used to enlarge an image.

The control unit 260 includes an eye gaze detecting unit 261, a touch determining unit 262, and a display control unit 263. For example, the control unit 260 corresponds to an integrated circuit, such as an ASIC or an FPGA. Furthermore, the control unit 260 corresponds to an electronic circuit, such as a CPU or an MPU.

The eye gaze detecting unit 261 is a processing unit that detects the eye gaze position on the touch panel 240. The eye gaze detecting unit 261 outputs information on the eye gaze position to the display control unit 263. The process for detecting the eye gaze position performed by the eye gaze detecting unit 261 is the same as that performed by the eye gaze detecting unit 161 in the first embodiment; therefore, a description thereof will be omitted.

The touch determining unit 262 is a processing unit that determines whether a touch operation has been performed on the touch panel 240. The touch determining unit 262 outputs, to the display control unit 263, the determination result indicating whether the touch operation has been performed.

The display control unit 263 is a processing unit that enlarges and displays a screen image with the eye gaze position as the center of gravity. The display control unit 263 performs the following process, which is triggered when information indicating that a touch operation has been performed is received from the touch determining unit 262.

The display control unit 263 acquires an image of an enlarge button from the button image information 251 and displays the enlarge button in the default area 143. If the display control unit 263 receives a touch operation with respect to the enlarge button, the display control unit 263 enlarges the image on the touch panel 240 with the eye gaze position being at the center. For example, the display control unit 263 may also determine an image enlargement percentage in accordance with the number of touch operations performed on the enlarge button within a predetermined time period and enlarge an image in accordance with the determined image enlargement percentage. For example, the display control unit 263 determines the enlargement percentage on the basis of Equation (1) below, where n is the number of touch operations performed within a predetermined time period.

$$\text{image enlargement percentage (\%)} = 100 + 10 \times n \quad (1)$$

If the display control unit 263 has not received a touch operation with respect to the enlarge button within the predetermined time period after displaying the enlarge button, the display control unit 263 deletes the enlarge button.

Figure 18:
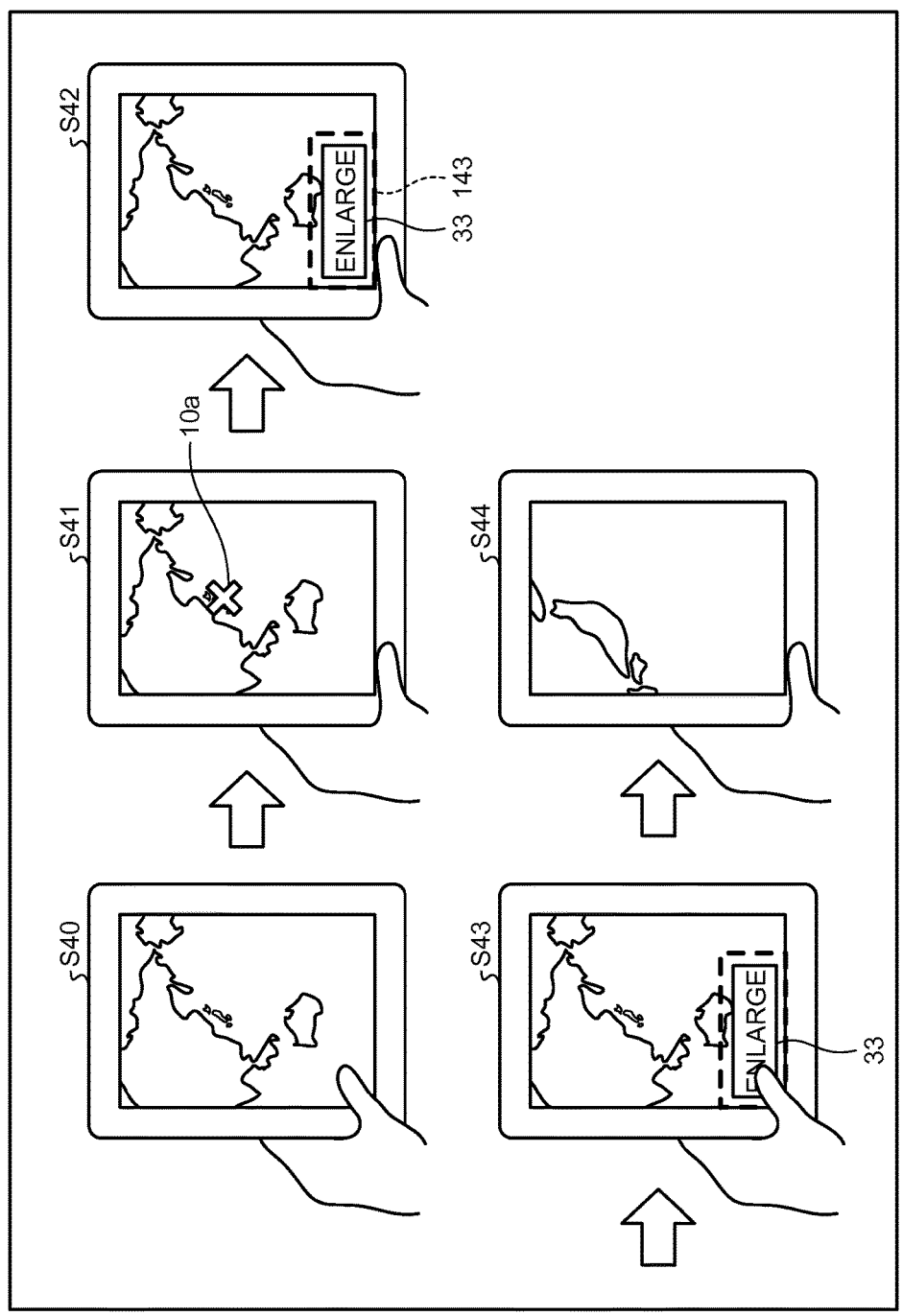
FIG. 18 is a schematic diagram illustrating screen images of the tablet device according to the second embodiment.

In the following, a screen image on the tablet device 200 according to the second embodiment will be described. FIG. 18 is a schematic diagram illustrating screen images of the tablet device according to the second embodiment. As illustrated in FIG. 18, the tablet device 200 displays an image on the screen (Step S40) and detects the eye gaze position 10a (Step S41).

The tablet device 200 displays an enlarge button 33 in the default area 143 (Step S42). If the tablet device 200 receives a touch operation with respect to the enlarge button 33 (Step S43), the tablet device 200 enlarges the image with the eye gaze position 10a being at the center (Step S44).

Figure 19:
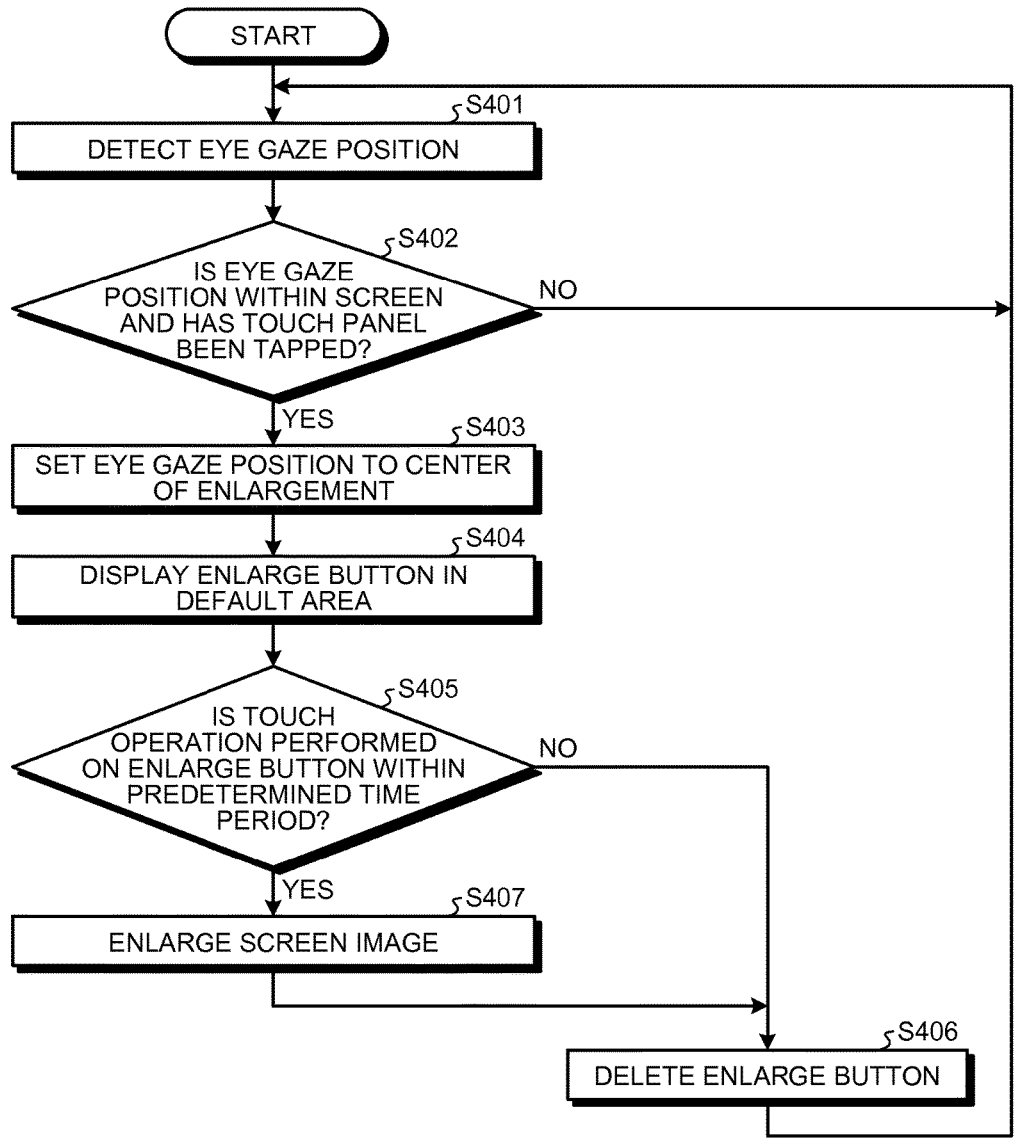
FIG. 19 is a flowchart illustrating the flow of a process performed by the tablet device according to the second embodiment.

In the following, the flow of a process performed by the tablet device 200 according to the second embodiment will be described. FIG. 19 is a flowchart illustrating the flow of a process performed by the tablet device according to the second embodiment. The process illustrated in FIG. 19 is performed when image data is acquired from, for example, the camera 210. As illustrated in FIG. 19, the tablet device 200 detects the eye gaze position (Step S401) and determines whether the eye gaze position is within the screen and whether the touch panel 240 has been tapped (Step S402). If the eye gaze position is not within the screen or if the touch panel 240 has not been tapped (No at Step S402), the tablet device 200 proceeds to Step S401.

In contrast, if the eye gaze position is within the screen and if the touch panel 240 has been tapped (Yes at Step S402), the tablet device 200 sets the eye gaze position to the center of the enlargement (Step S403). The tablet device 200 then displays the enlarge button in the default area 143 (Step S404).

The tablet device 200 determines whether a touch operation is performed on the enlarge button within a predetermined time period (Step S405). If a touch operation is not performed on the enlarge button within a predetermined time period (No at Step S405), the tablet device 200 deletes the enlarge button (Step S406) and proceeds to Step S401.

If a touch operation is performed on the enlarge button within a predetermined time period (Yes at Step S405), the tablet device 200 enlarges the screen image (Step S407) and proceeds to Step S406.

In the following, the advantage of the tablet device 200 according to the second embodiment will be described. If the tablet device 200 displays the enlarge button in the default area 143 and receives a touch operation with respect to the enlarge button, the tablet device 200 enlarges the image with the eye gaze position being at the center. Because the default area 143 is the reach of the user's thumb of the hand with which he or she is holding the tablet device 200, the user can conveniently enlarge the image area of desired by the user even if the user is operating the tablet device 200 with one hand.

[c] Third Embodiment

In the first and the second embodiments described above, the processes performed by the tablet devices 100 and 200 are described; however, the processes are only examples. In a third embodiment, another process performed by the tablet device will be described. In the third embodiment, for convenience of description, a description will be given by using the tablet device 100 illustrated in FIG. 1.

In the following, an example of a menu image or the like used for selecting the link destination will be described. If the number of link destinations included in the target area 142 is large, the number of selection buttons included in the menu image also becomes large. Consequently, if all of the buttons are displayed in the default area 143, the size of the selection button becomes small and thus it is difficult for a user to perform a touch operation on a selection button. Thus, if the number of link destinations in the target area 142 is equal to or greater than a predetermined number, the tablet device 100 may also display some of the selection buttons in a menu image and, if the tablet device 100 receives an instruction to switch the selection buttons, the tablet device 100 may also display selection buttons by switching the displayed selection buttons.

Figure 20:
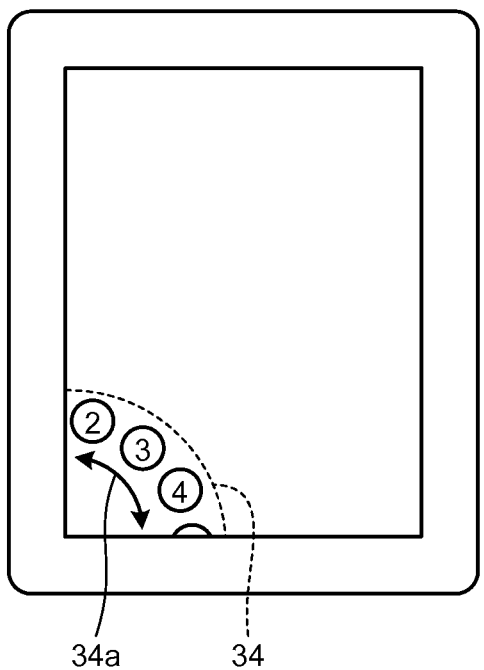
FIG. 20 is a schematic diagram illustrating an example of another menu image (No. 1)
Figure 21:
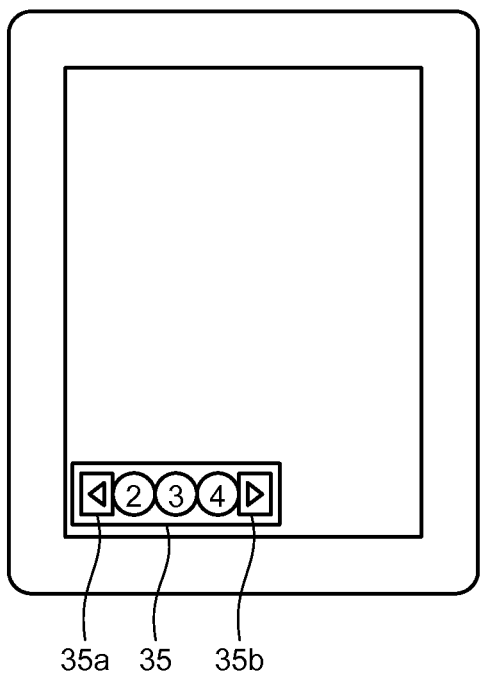
FIG. 21 is a schematic diagram illustrating an example of another menu image (No. 2)

FIGS. 20 and 21 are schematic diagrams each illustrating an example of another menu image. As illustrated in FIG. 20, some of the selection buttons are displayed in a menu image 34. If a user selects one of the undisplayed selection buttons, the user performs a touch operation on an arrow 34a. For example, if the display control unit 165 receives a swipe with respect to the arrow 34a in the downward direction, the display control unit 165 displays other selection buttons. Furthermore, the display control unit 165 may also display a menu image 35 like that illustrated in FIG. 21. If the display control unit 165 receives a touch operation with respect to a switch button 35a or 35b, the display control unit 165 displays other buttons. Furthermore, the display control unit 165 may also display a selection button by using a pulldown format. With such a process performed by the display control unit 165, a user can conveniently select an operation button even if multiple link destinations are present in the target area 142.

In the following, a process for correcting the eye gaze position performed by the tablet device 100 will be described. For example, in the first embodiment, as described at Step S102 illustrated in FIG. 14, at Step S202 illustrated in FIG. 15, and at Step S302 illustrated in FIG. 16, if the eye gaze position is within the screen and if the touch panel 140 has been tapped, the target area 142 is specified by using the eye gaze position as the center. However, the angle of the tablet device 100 may possibly shift due to the tap operation and thus the eye gaze position may also shift.

Accordingly, for example, the area specifying unit 162 may also acquire, from the touch determining unit 164, information indicating whether a user has performed a touch operation and specify the target area 142 by using the eye gaze position at a predetermined time before the touch operation is performed. Alternatively, the area specifying unit 162 may also calculate the average of the eye gaze positions during the time period between a predetermined time before a touch operation is performed and a time immediately before the touch operation is performed and then set the target area 142. Because the area specifying unit 162 performs such an operation, it is possible to correct the shift of the eye gaze position due to a touch operation.

In the following, another process performed by the display control unit 165 will be described. In the first embodiment described above, the display control unit 165 separately displays the menu images 30, 31, and 32 in the default area 143; however, the configuration is not limited thereto. The display control unit 165 may also integrally display the menu images 30, 31, and 32 in accordance with the content of the touch operation performed in the target area 142. For example, if multiple link destinations and video images are present in the target area 142, the display control unit 165 displays the menu images 31 and 32 in the default area 143.

Furthermore, if multiple link destinations are present, it may sometimes be difficult to find the association relationship between the selection buttons and the link destinations if only the menu image 31 is displayed. Accordingly, the display control unit 165 may also visually associate the option items in the target area 142 with the selection buttons in the menu image. For example, the display control unit 165 may also display the associated selection buttons and option items in the same color or display them connected with a line. Alternatively, the display control unit 165 may also display the selection buttons in the menu image 31 aligned in the link destination order in the target area 142. With such a process performed by the display control unit 165, the relationship between the selection buttons in the menu image and the link destinations in the target area 142 becomes clear. Consequently, it is easy for a user to find a desired link destination when the user selects a selection button associated with a touch operation.

Furthermore, the menu image 32 used to operate the video image illustrated in FIG. 6 is only an example. A video image may sometimes be automatically replayed depending on the type of video image in the target area 142. Accordingly, for a video image that is automatically replayed, the display control unit 165 may also have a pause button instead of the replay button 32a. Alternatively, the display control unit 165 may also display, in the menu image 32, an operation button for jumping the replay time of the video image to the desired time.

The various processes described in the above embodiments can be implemented by programs prepared in advance and executed by a computer such as a personal computer or a workstation. Accordingly, in the following, a computer that executes an operation receiving program having the same function performed in the embodiments will be described, as an example, with reference to FIG. 22.

Figure 22:
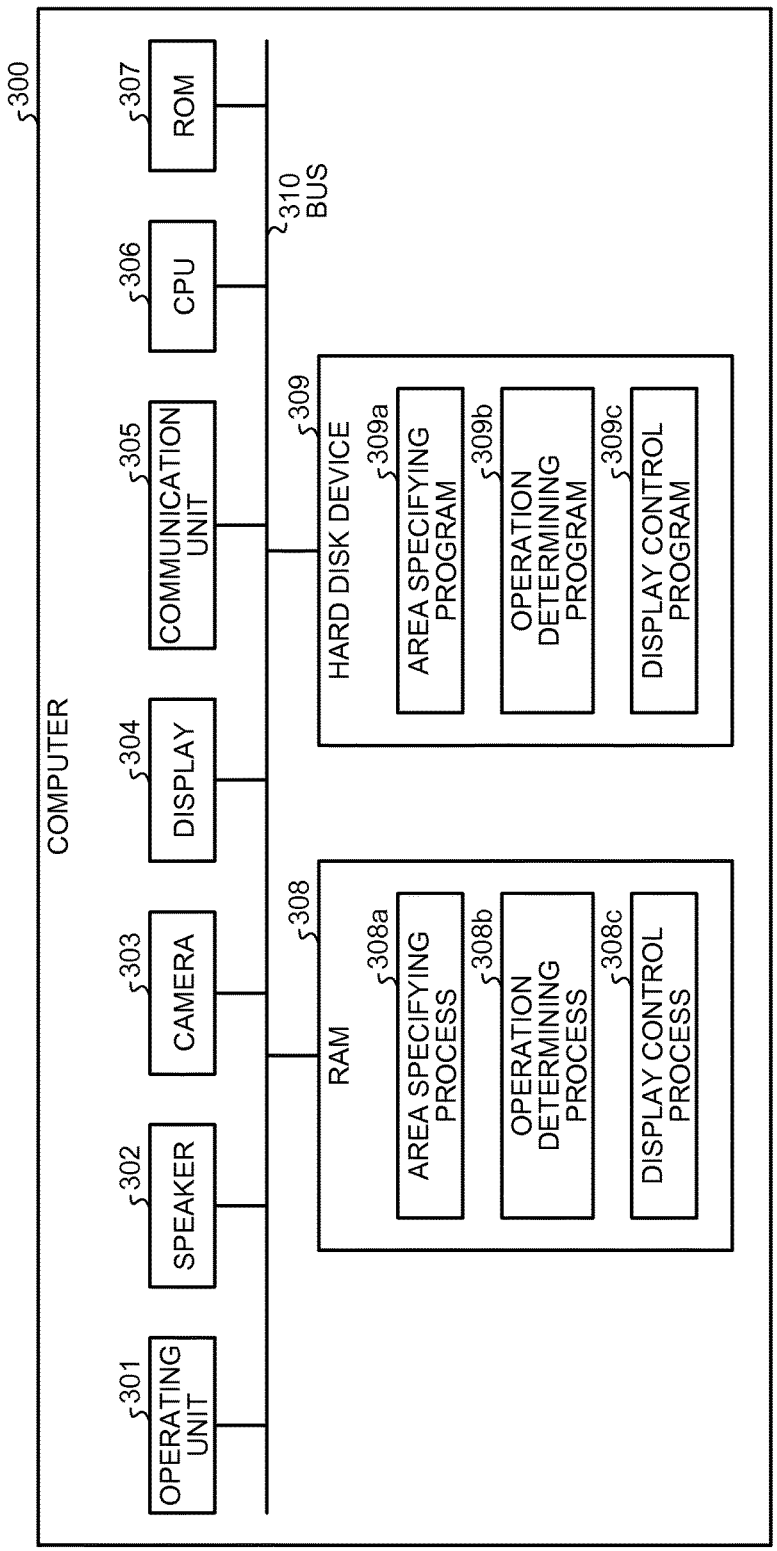
FIG. 22 is a block diagram illustrating an example of a computer that executes an operation receiving program according to an embodiment.

FIG. 22 is a block diagram illustrating an example of a computer that executes an operation receiving program according to an embodiment. As illustrated in FIG. 22, a computer 300 includes an operating unit 301, a speaker 302, a camera 303, a display 304, and a communication unit 305. Furthermore, the computer 300 includes a CPU 306, a ROM 307, a RAM 308, and a hard disk device 309, all of which are connected via a bus 310.

As illustrated in FIG. 22, the hard disk device 309 stores therein an area specifying program 309a, an operation determining program 309b, and a display control program 309c.

Then, the CPU 306 reads the area specifying program 309a, the operation determining program 309b, and the display control program 309c and loads the programs in the RAM 308. The area specifying program 309a functions as an area specifying process 308a. The operation determining program 309b functions as an operation determining process 308b. The display control program 309c functions as a display control process 308c.

For example, the area specifying process 308a performs the process corresponding to the processes performed by the eye gaze detecting unit 161, the area specifying unit 162, and the like illustrated in FIG. 1. The operation determining process 308b performs the process corresponding to the process performed by the operation determining unit 163 illustrated in FIG. 1. The display control process 308c performs the process corresponding to the processes performed by the touch determining unit 164, the display control unit 165, and the like.

Furthermore, each of the programs 309a to 309c does not always need to be initially stored in the hard disk device 309 or the like. For example, each program may be stored in a "portable physical medium", such as a flexible disk (FD), a CD-ROM, a DVD disk, a magneto-optic disk, or an IC card, that is to be inserted into the computer 300. Then, the computer 300 may read and execute each program from the portable physical medium. Furthermore, each program may be stored in another computer, a server device, or the like that is connected to the computer 300 through a public circuit, the Internet, a LAN, a WAN or the like and the computer 300 may obtain each program from the other computer or the server device and execute the program.

According to an aspect of a tablet device disclosed in the present invention, an advantage is provided in that it is possible to conveniently operate a touch panel even with one hand.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tablet device comprising:
a memory; and
a processor coupled to the memory, wherein the processor executes a first process comprising:
detecting an eye gaze position on a touch panel;
first determining whether a first touch operation has been performed on the touch panel;
second determining an area including an eye gaze position detected a predetermined time before the first touch operation;
third determining a content of a second touch operation corresponding to the area determined by the second determining;
creating an option associated with the content of the second touch operation determined by the third determining; and
displaying the created option in a predetermined area of the touch panel, the predetermined area being reached by a thumb which is being used to support the tablet device while a user is holding the tablet device;
performing a second process in accordance with the second touch operation detected from the created option;
allowing the created option to remain displayed on a screen that has been changed by the second process,
wherein the second determining corrects the eye gaze position at a time of the first touch operation to an eye gaze position at a predetermined time before the first touch operation, and determines an area including the corrected eye gaze position.

2. The tablet device according to claim 1, wherein, when the number of the options associated with the content of the touch operation is equal to or greater than a predetermined number, the displaying, in the predetermined area, some of the options from among the multiple options.

3. The tablet device according to claim 1, wherein the displaying the option in the predetermined area of the touch panel by associating a target touch operation in the area specified by the specifying with the option.

4. The tablet device according to claim 1, wherein the third determining acquires source code corresponding to the area determined by the second determining and determines a touch operation among multiple touch operations based on the source code.

5. An operation receiving method executed by a computer, the operation receiving method comprising:
detecting an eye gaze position on a touch panel;
first determining whether a first touch operation has been performed on the touch panel;
second determining an area including an eye gaze position detected a predetermined time before the first touch operation;
third determining a content of a second touch operation corresponding to the area determined by the second determining performed in the specified area;
creating an option associated with the content of the second touch operation; and
displaying the created option in a predetermined area of the touch panel, the predetermined area being reached by a thumb which is being used to support the tablet panel while a user is holding the tablet panel;
performing a process in accordance with the second touch operation detected from the created option;
allowing the created option to remain displayed on a screen that has been changed by the process,
wherein the second determining corrects the eye gaze position at a time of the first touch operation to an eye gaze position at a predetermined time before the first touch operation, and determines an area including the corrected eye gaze position.

6. The operation receiving method according to claim 5, wherein, when the number of the options associated with the content of the touch operation is equal to or greater than a predetermined number, the displaying includes displaying, in the predetermined area, some of the options from among the multiple options.

7. The operation receiving method according to claim 5, wherein the displaying includes displaying the option in the predetermined area of the touch panel by associating a target touch operation in the specified area with the option.

8. A computer-readable non-transitory medium having stored therein an operation receiving program causing a computer to execute a first process comprising:
detecting an eye gaze position on a touch panel;
first determining whether a first touch operation has been performed on the touch panel;
second determining an area including an eye gaze position detected a predetermined time before the first touch operation;
third determining a content of a second touch operation corresponding to the area determined by the second determining performed in the specified area;
creating an option associated with the content of the second touch operation; and
displaying the created option in a predetermined area of the touch panel, the predetermined area being reached by a thumb which is being used to support the tablet panel while a user is holding the tablet panel;
performing a second process in accordance with the second touch operation detected from the created option;
allowing the created option to remain displayed on a screen that has been changed by the second process,
wherein the second determining corrects the eye gaze position at a time of the first touch operation to an eye gaze position at a predetermined time before the first touch operation, and determines an area including the corrected eye gaze position.

9. The computer-readable non-transitory medium according to claim 8, wherein, when the number of the options associated with the content of the touch operation is equal to or greater than a predetermined number, the displaying includes displaying, in the predetermined area, some of the options from among the multiple options.

10. The computer-readable non-transitory medium according to claim 8, wherein the displaying includes displaying the option in the predetermined area of the touch panel by associating a target touch operation in the specified area with the option.

\* \* \* \* \*